(12) United States Patent
Mitsui

(10) Patent No.: US 8,615,848 B2
(45) Date of Patent: Dec. 31, 2013

(54) HINGE APPARATUS FOR ELECTRONIC DEVICE

(75) Inventor: Yasuhiro Mitsui, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 0 days.

(21) Appl. No.: 13/809,213

(22) PCT Filed: Jul. 11, 2011

(86) PCT No.: PCT/JP2011/065813
§ 371 (c)(1),
(2), (4) Date: Jan. 9, 2013

(87) PCT Pub. No.: WO2012/008420
PCT Pub. Date: Jan. 19, 2012

(65) Prior Publication Data
US 2013/0111704 A1    May 9, 2013

(30) Foreign Application Priority Data

Jul. 12, 2010  (JP) .................................. 2010 157781
Jul. 4, 2011   (JP) .................................. 2011 148699

(51) Int. Cl.
*E05D 7/00*    (2006.01)
*E05D 3/06*    (2006.01)

(52) U.S. Cl.
USPC ........................... 16/366; 16/354; 379/433.13

(58) Field of Classification Search
USPC ........... 16/354, 366, 303, 330, 340, 365, 368, 16/369, 370; 361/679.27, 679.28; 379/433.12, 433.13; 455/575.1, 575.3, 455/575.8
See application file for complete search history.

(56) References Cited

U.S. PATENT DOCUMENTS

| | | | | |
|---|---|---|---|---|
| 4,765,027 A | * | 8/1988 | Andric | 16/354 |
| 5,249,089 A | * | 9/1993 | Maeng | 360/96.51 |
| 5,754,395 A | * | 5/1998 | Hsu et al. | 361/679.11 |
| 5,867,872 A | * | 2/1999 | Katoh | 16/337 |
| 6,191,937 B1 | * | 2/2001 | Bang | 361/679.23 |
| 6,253,419 B1 | * | 7/2001 | Lu | 16/340 |

(Continued)

FOREIGN PATENT DOCUMENTS

| | | | |
|---|---|---|---|
| JP | 2005-023955 | | 1/2005 |
| JP | 2005023955 A | * | 1/2005 |

(Continued)

OTHER PUBLICATIONS

International Search Report mailed on Oct. 11, 2011.

*Primary Examiner* — Victor Batson
*Assistant Examiner* — Jason W San
(74) *Attorney, Agent, or Firm* — Ipusa, PLLC

(57) ABSTRACT

A hinge apparatus for an electronic device includes a cam unit and a gear unit provided at a connecting position of an upper plate and a lower plate. The cam unit includes a first cam mechanism for causing a first cam shaft connected to an upper plate to generate a torque and a second cam mechanism for causing a second cam shaft connected to a lower plate to generate a torque. Further, the gear unit includes a first gear shaft connected to the upper plate and a second gear shaft connected to the lower plate, a first gear provided in the first gear shaft, a first gear provided in the second gear shaft, and a gear mechanism that synchronizes and rotates the first gear shaft and the second gear shaft.

3 Claims, 20 Drawing Sheets

(56) References Cited

U.S. PATENT DOCUMENTS

| | | | |
|---|---|---|---|
| 7,239,504 B2 * | 7/2007 | Schlesener et al. | 361/679.09 |
| 7,319,749 B2 * | 1/2008 | Lu et al. | 379/433.13 |
| 7,414,834 B2 * | 8/2008 | Ukonaho et al. | 361/679.55 |
| 7,483,723 B2 * | 1/2009 | Soderlund | 455/575.1 |
| 7,484,271 B2 * | 2/2009 | Oshima et al. | 16/366 |
| 7,506,608 B2 * | 3/2009 | Sato et al. | 116/330 |
| 7,513,011 B2 * | 4/2009 | Lu et al. | 16/337 |
| 7,515,707 B2 * | 4/2009 | Ka et al. | 379/433.12 |
| 7,730,587 B2 * | 6/2010 | Chang et al. | 16/340 |
| 7,765,644 B2 * | 8/2010 | Ueyama et al. | 16/354 |
| 7,805,810 B2 * | 10/2010 | Hoffman | 16/354 |
| 7,832,056 B2 * | 11/2010 | Kuwajima et al. | 16/354 |
| 7,900,323 B2 * | 3/2011 | Lin | 16/366 |
| 7,907,415 B2 * | 3/2011 | Ueyama | 361/749 |
| 8,104,144 B2 * | 1/2012 | Wang et al. | 16/354 |
| 8,205,305 B2 * | 6/2012 | Wang et al. | 16/354 |
| 8,296,905 B2 * | 10/2012 | Zhang et al. | 16/366 |
| 8,312,596 B2 * | 11/2012 | Self | 16/354 |
| 8,474,101 B2 * | 7/2013 | Wang et al. | 16/366 |
| 2002/0038493 A1 * | 4/2002 | Ko et al. | 16/303 |
| 2005/0050686 A1 | 3/2005 | Kurokawa | |
| 2005/0117284 A1 * | 6/2005 | Kida | 361/681 |
| 2006/0238970 A1 * | 10/2006 | Ukonaho et al. | 361/683 |
| 2006/0262496 A1 * | 11/2006 | Lee | 361/683 |
| 2007/0289099 A1 * | 12/2007 | Jung | 16/354 |
| 2008/0109995 A1 * | 5/2008 | Kuwajima et al. | 16/354 |
| 2008/0134468 A1 * | 6/2008 | Chen et al. | 16/340 |
| 2008/0151478 A1 * | 6/2008 | Chern | 361/681 |
| 2008/0307608 A1 * | 12/2008 | Goto | 16/366 |
| 2009/0007372 A1 * | 1/2009 | Ueyama et al. | 16/50 |
| 2009/0013500 A1 * | 1/2009 | Ueyama et al. | 16/354 |
| 2009/0070961 A1 * | 3/2009 | Chung et al. | 16/354 |
| 2009/0282650 A1 * | 11/2009 | Jin et al. | 16/367 |
| 2010/0071159 A1 * | 3/2010 | Myung | 16/303 |
| 2011/0265288 A1 * | 11/2011 | Chiang | 16/341 |
| 2012/0149438 A1 * | 6/2012 | Kwon | 455/566 |
| 2012/0182677 A1 * | 7/2012 | Seo | 361/679.01 |
| 2012/0248048 A1 * | 10/2012 | Wu et al. | 211/26 |
| 2013/0014346 A1 * | 1/2013 | Ahn et al. | 16/354 |
| 2013/0016489 A1 * | 1/2013 | Yeh et al. | 361/807 |

FOREIGN PATENT DOCUMENTS

| | | | |
|---|---|---|---|
| JP | 2005133759 A * | 5/2005 | |
| JP | 2008-075747 | 4/2008 | |
| JP | 2008-144962 | 6/2008 | |
| JP | 2008-215365 | 9/2008 | |
| JP | 2009-041729 | 2/2009 | |
| JP | 2009-222079 | 10/2009 | |
| JP | 2012037049 A * | 2/2012 | |

* cited by examiner

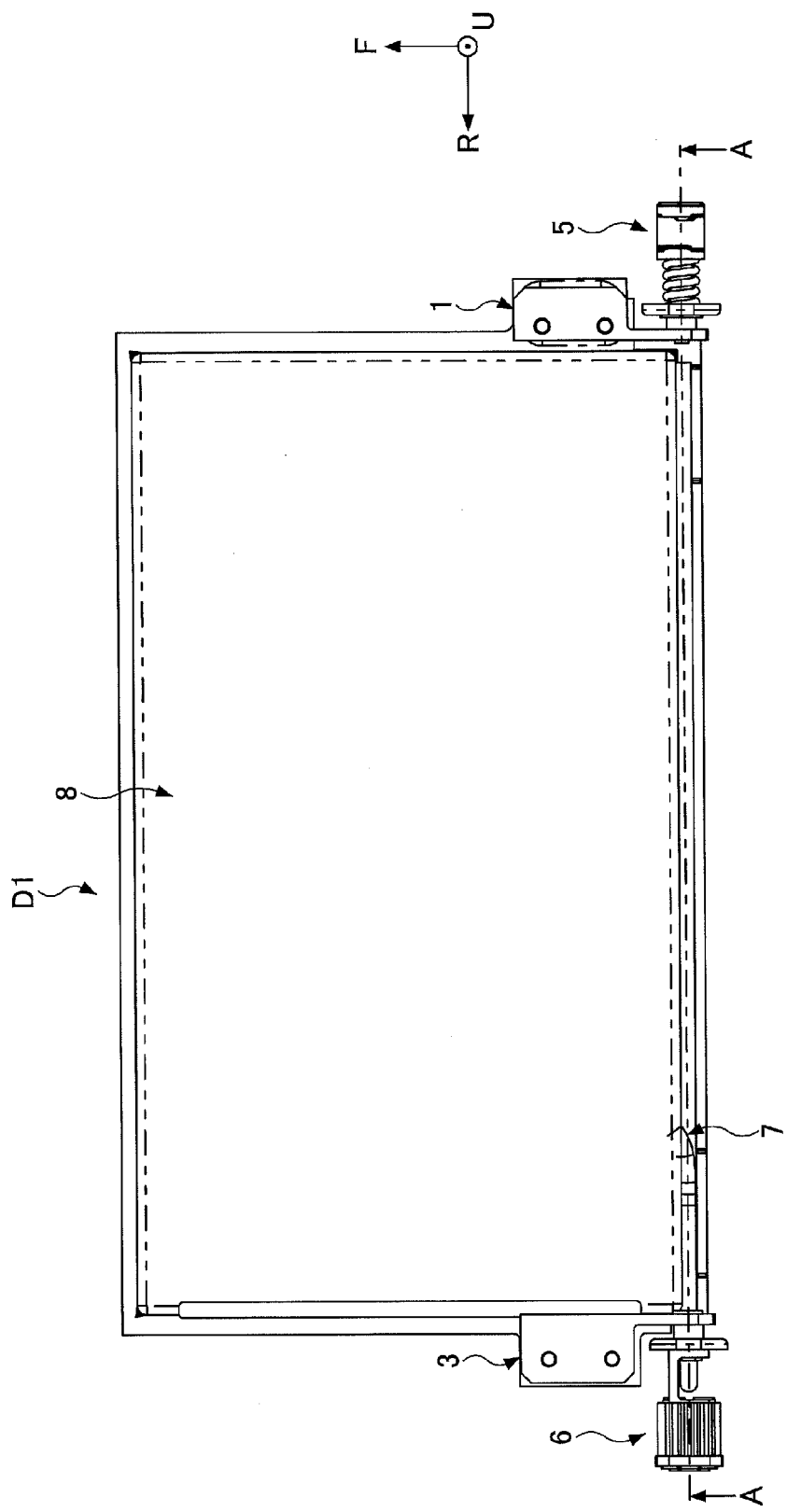

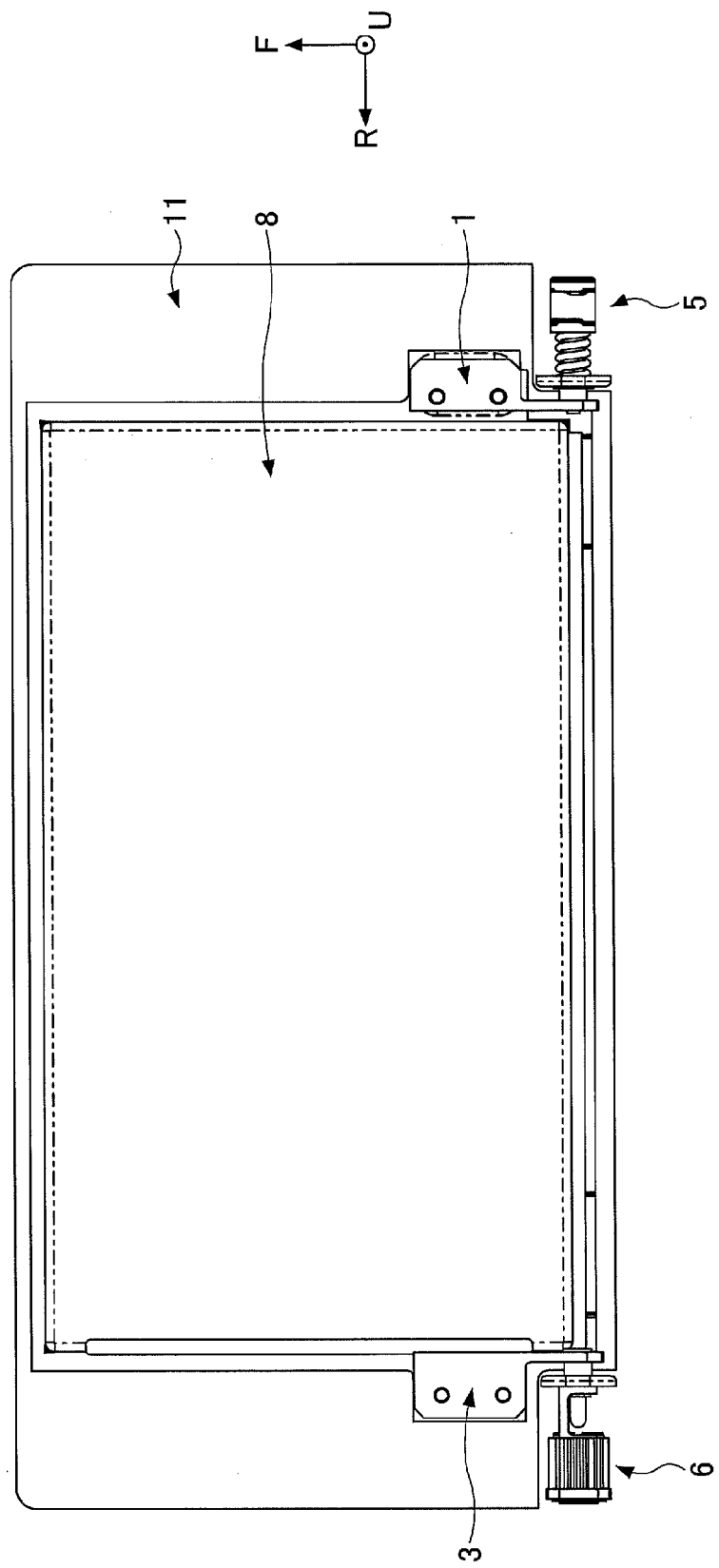

FIG.10A
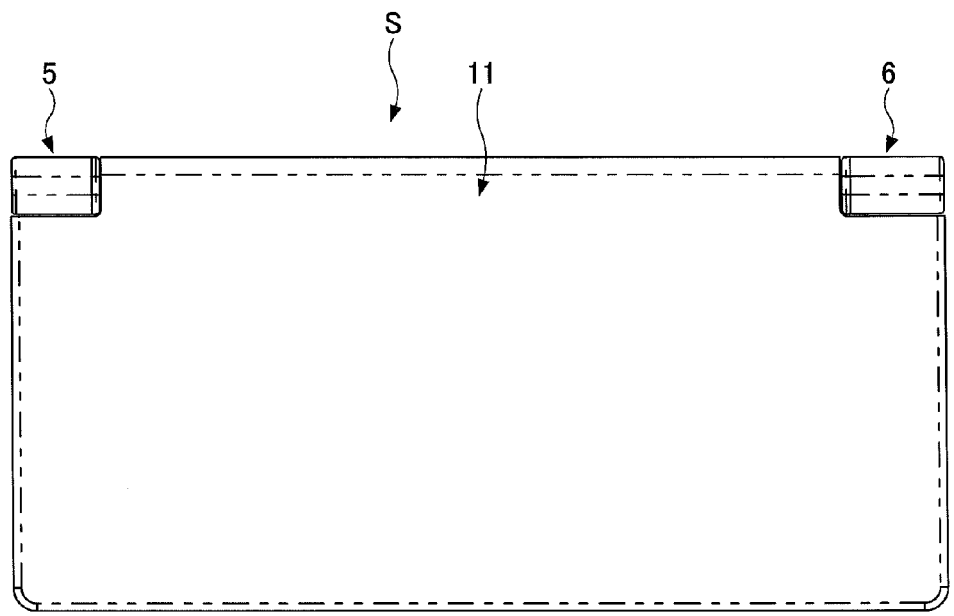
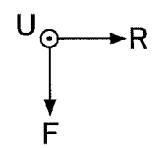
FIG.10B
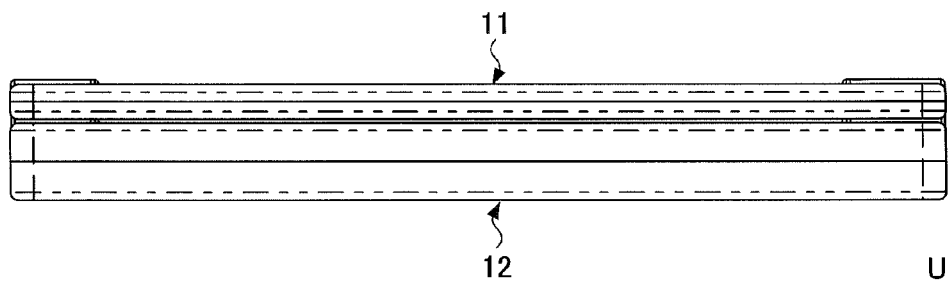
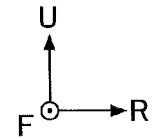

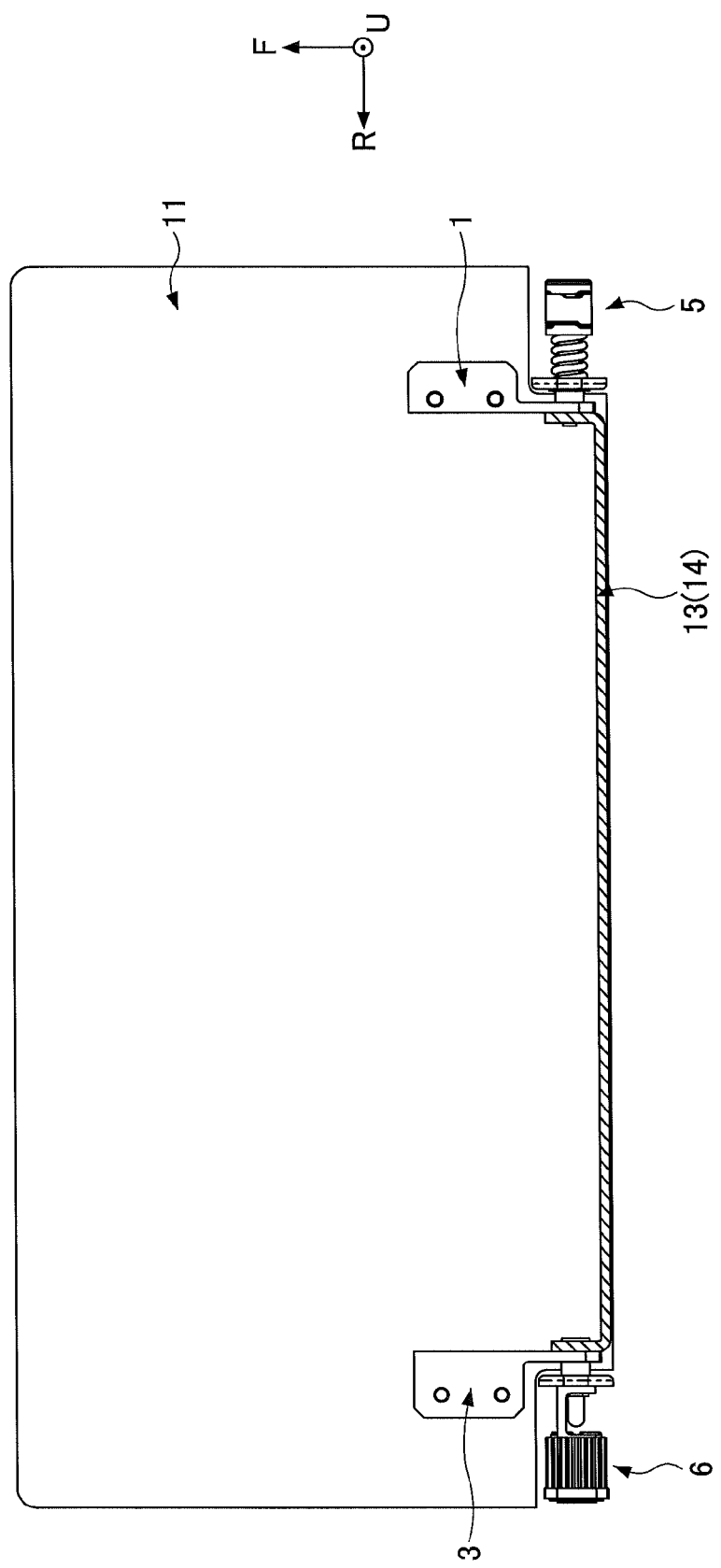

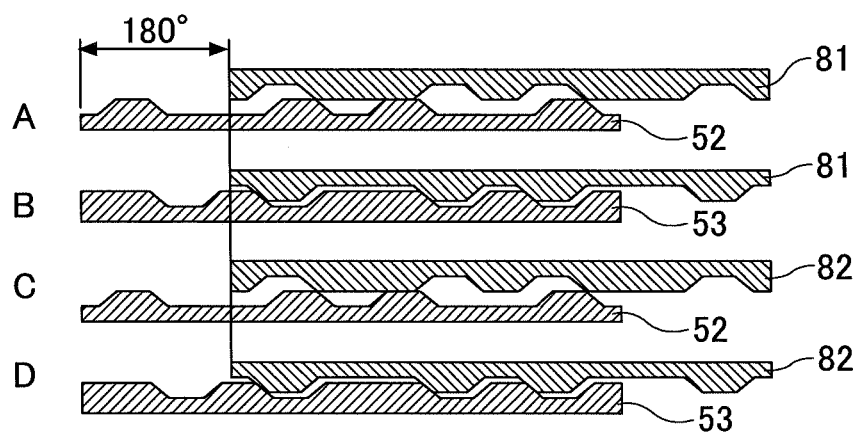

HINGE APPARATUS FOR ELECTRONIC DEVICE

TECHNICAL FIELD

The present invention relates to a hinge apparatus for an electronic device such as a portable terminal that oscillates a lid body part relative to a main body part.

BACKGROUND ART

A collapsible electronic device such as a portable telephone or a laptop computer includes, for example, a main body part including ten-keys or the like and a lid body part including a liquid crystal display or the like. Further, a hinge apparatus is provided at a connecting area between the main body part and the lid body part for rotating (oscillating) the lid body part relative to the main body part.

A hinge apparatus used for the above-described type of electronic device is disclosed in Patent Document 1. The hinge device for the electronic device disclosed in Patent Document 1 is a so-called double shaft type hinge apparatus. With the double shaft type hinge apparatus, the lid body part can be rotated 180 degrees about a first rotation shaft relative to the main body part. In addition, the main body part can be rotated 180 degrees about a second rotation shaft relative to the lid body part. Therefore, as a whole, the lid body part can be rotated 360 degrees relative to the main body part.

Further, the hinge apparatus disclosed in Patent Document 1 has a cam mechanism and a gear mechanism integrally provided therein. By providing the cam mechanism, a toggle is generated when the lid body part is positioned having a predetermined rotation angle relative to the main body part, to thereby retain the lid body part. Accordingly, visibility of the liquid crystal display or the like can be improved.

RELATED ART REFERENCE

Patent Document

Patent Document 1: Japanese Laid-Open Patent Publication No. 2005-023955

DISCLOSURE OF THE INVENTION

Problem to be Solved by Invention

Because the conventional hinge apparatus for an electronic device has the cam mechanism and the gear mechanism integrally provided inside the hinge apparatus, it is inevitable for the size to become large. Therefore, as illustrated in Patent Document 1, the conventional hinge apparatus for an electronic device is arranged at a center area of the electronic device.

However, the center area of the electronic device is where main electronic circuits and electronic components of the electronic device (hereinafter referred to as "main components and the like") are arranged. Thus, conventionally, due to the hinge apparatus occupying a large area of the center area of the electronic device, there are problems such as lack of degree of freedom for arranging the main components and size increase of the electronic device.

Means for Solving Problem

It is a general object of the present invention to provide an improved useful hinge apparatus for an electronic device that solves the above-described problems of the related art.

It is a specific object of the present invention to provide a hinge apparatus for an electronic device that improves the efficiency of using space of the electronic device.

In order to achieve such object, the present invention provides a hinge apparatus for an electronic device including a cam unit; and a gear unit; wherein the cam unit includes a cam cover, a first cam shaft that is rotatably arranged in the cam cover and connected to a first cam bracket fixed to a first plate, a first cam mechanism that causes the first cam shaft to generate a torque, a second cam shaft configured to independently rotate relative to the first cam shaft and connected to a second cam bracket fixed to a second plate, and a second cam mechanism that causes the second cam shaft to generate a torque, wherein the gear unit includes a gear cover, a first gear shaft that is rotatably arranged in the gear cover and connected to a first cam bracket fixed to the first plate, a first gear part arranged in the first gear shaft, a second gear shaft that is rotatably arranged in the gear cover and connected to a second cam bracket fixed to the second plate, a second gear part arranged in the second gear shaft, and a gear mechanism including the first gear part and the second gear part, and configured to synchronize and rotate the first gear shaft and the second gear shaft, wherein the cam unit and the gear unit are positioned away from and faced against the first and second plates that are rotatable relative to each other.

Further, in the present invention, the first gear shaft and the second gear shaft may be configured to rotate in different directions relative to each other.

Further, in the present invention, the first and second cam mechanisms may be configured to generate the torque one time when the second plate is rotate 360 degrees relative to the first plate.

Effect of the Invention

With the present invention, by arranging a cam unit (which generates a torque at a predetermined rotation position) and a gear unit (which performs synchronization when first and second plates are rotated) separate from each other, components and the like can be arranged between the cam unit and the gear unit. Thereby, the efficiency of using the space of an electronic device having a hinge apparatus mounted thereon can be improved.

BRIEF DESCRIPTION OF THE DRAWINGS

FIG. 5A is a plan view illustrating a substantial part of a hinge apparatus for an electronic device according to the first embodiment of the present invention;

FIG. 6 is a plan view illustrating a substantial part of a hinge apparatus for an electronic device according to the first embodiment of the present invention;

FIG. 10A is a plan view of an electronic apparatus using a hinge apparatus for an electronic device according to the first embodiment of the present invention;

FIG. 10B is front view of an electronic apparatus using a hinge apparatus for an electronic device according to the first embodiment of the present invention;

FIG. 12 is a schematic diagram illustrating a connection configuration of a bracket and an upper case of a hinge apparatus for electronic device according to a second embodiment of the present invention;

FIG. 17B is a developed view illustrating a rear installed state of cams of first and second cam parts.

EXPLANATION OF REFERENCE NUMERALS

Figure 1:
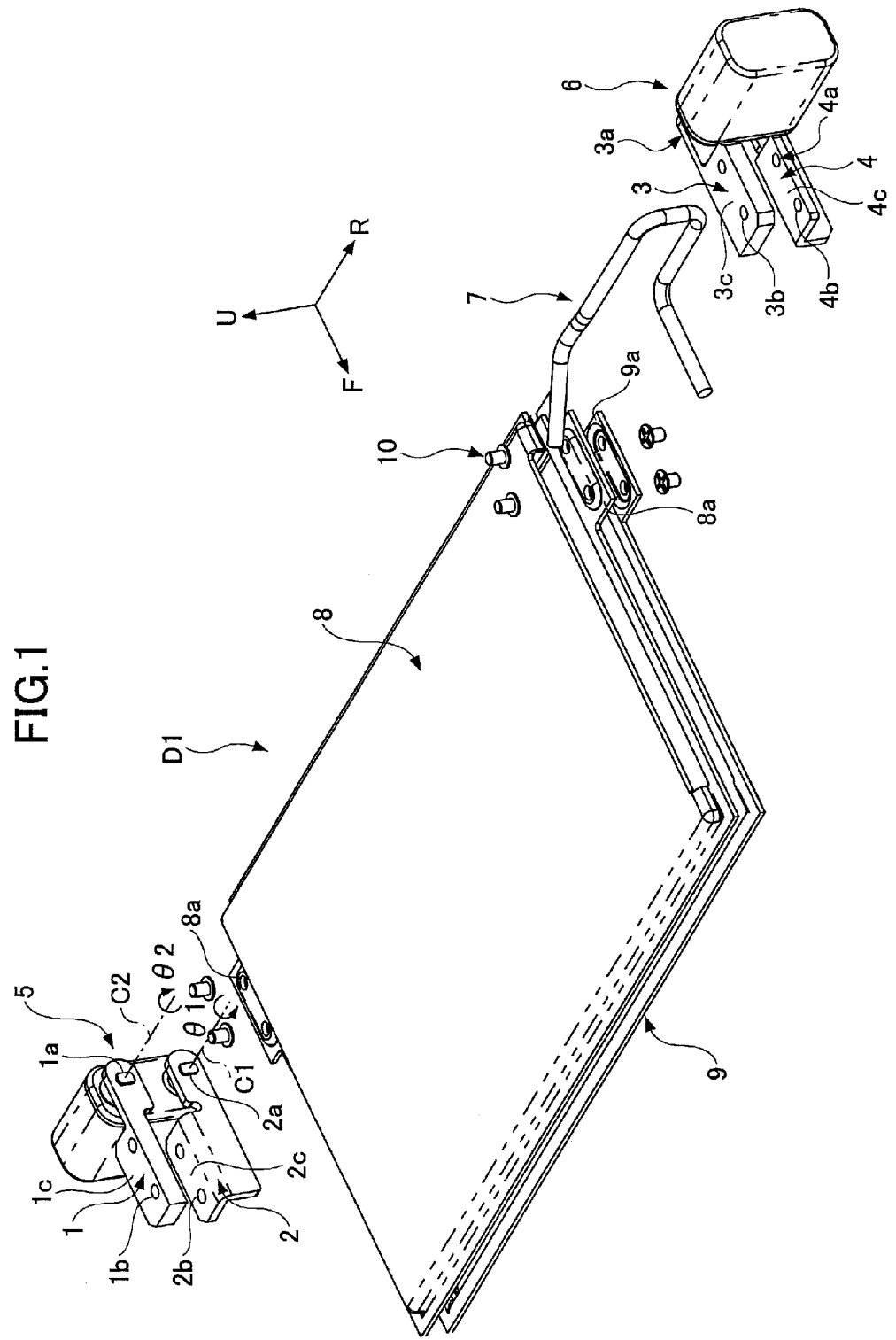
FIG. 1 is an exploded perspective view of a hinge apparatus for an electronic device according to a first embodiment of the present invention.

S electronic device
D1 hinge apparatus for an electronic device
D2 hinge apparatus for an electronic device
1 upper cam bracket (first cam side bracket)
2 lower cam bracket (second cam side bracket)
3 upper gear bracket (first gear side bracket)
4 lower gear bracket (second gear side bracket)
5 cam unit
6 gear unit
7 cord
8 upper plate (first plate)
9 lower plate (second plate)
10 fastening screw
11 upper case
12 lower case
13 synchro-bar
14 synchro-bar
50A first cam mechanism
50B second cam mechanism
52, 53 cam plate
54 spring
55A first cam shaft
55B second cam shaft
56 hinge cover
57 hinge cap
61A first gear shaft
61B second gear shaft
61$b$ gear part
62A, 62B gear
63A, 63B gear shaft
64, 66 support plate
65 middle plate
67 riveting plate
68 gear cover
69 gear cap
70 gear shaft
70$a$ insertion hole

EMBODIMENTS OF THE INVENTION

As illustrated in FIG. 1, a hinge apparatus D1 for an electronic device according to an embodiment of the present invention includes a cam unit 5 and a gear unit 6. The cam unit 5 and the gear unit 6 have a function of opening/closing an upper plate relative to a lower plate 9.

The cam unit 5, which is positioned on the left side in FIG. 1, includes an upper cam bracket 1 and a lower cam bracket 2. Further, the gear unit 6, which is positioned on the right side in FIG. 1, includes an upper gear bracket 3 and a lower gear bracket 4.

A hole part 2$a$ of the lower cam bracket 2 is a coupling point (i.e. center of oscillation of the lower plate 9) of the lower cam bracket 2 relative to the cam unit 5. The hole part 2$a$ constitutes a lower plate oscillation shaft line C1 that extends in a horizontal direction (arrow R direction). Arrow U and arrow F also indicate directions in the figures. A hole part 1$a$ of an upper cam bracket 1 is a coupling point (i.e. center of oscillation of the upper plate 8). The hole part 1$a$ constitutes an upper plate oscillation shaft line C2 that is parallel to the lower plate oscillation shaft line C1.

A coupling point of the lower gear bracket 4 relative to the gear unit 6 (positioned on the right side of FIG. 1) is positioned on the lower plate oscillation shaft line C1, and a coupling point of the upper gear bracket 3 relative to the gear unit 6 is positioned on the upper plate oscillation shaft line C2.

The cam unit 5 and the gear unit 6 cooperatively support the lower plate 9 to oscillate about the lower plate oscillation shaft line C1 and cooperatively support the upper plate 8 to oscillate about the upper plate oscillation shaft line C2.

The upper plate 8 has a pair of left/right ear parts 8a that project outward therefrom. Further, the lower plate 9 also has a pair of left/right ear parts 9a that project outward therefrom.

The upper cam bracket 1 has a flat surface part 1c in which a pair of front/rear attachment hole parts 1a is formed. The flat surface part 1c is fixed to an upper surface of the left ear part 8a by a fastening screw 10. The lower cam bracket 2 has a flat surface part 2c in which a pair of front/rear attachment hole parts 2b is formed. The flat surface part 2c is fixed to a lower surface of the left ear part 9a by the fastening screw 10.

The upper gear bracket 3 has a flat surface part 3c in which a pair of front/rear attachment hole parts 3b is formed. The flat surface part 3c is fixed to an upper surface of the right ear part 8a by the fastening screw 10. The lower gear bracket 4 has a flat surface part 4c in which a pair of front/rear attachment hole parts 4b is formed. The flat surface part 4c is fixed to a lower surface of the right ear part 9a by the fastening screw 10.

The cam unit 5 according to the first embodiment of the present invention functions as a unit for restricting oscillation of the upper cam bracket 1 and the lower cam bracket 2 at a predetermined angle by increasing torque at the predetermined angle during relative oscillation between the upper cam bracket 1 and the lower cam bracket 2.

Further, the gear unit 6 functions as a unit that synchronizes the rotation of the lower gear bracket 4 about the lower plate oscillation shaft line C1 (the angle of the rotation is hereinafter referred to as "first oscillation angle θ1") and the rotation of the upper gear bracket 3 about the upper plate oscillation shaft line C2 (the angle of the rotation is hereinafter referred to as "second oscillation angle θ2").

Figure 3A:
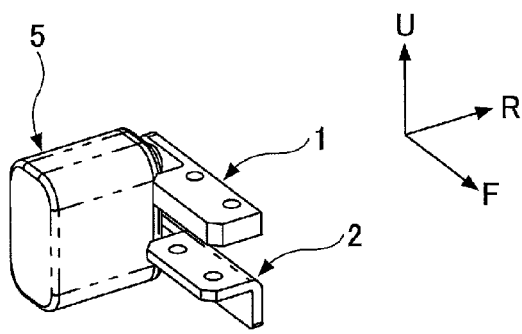
FIG. 3A is a perspective view of a cam unit constituting a hinge apparatus for an electronic device according to the first embodiment of the present invention.
Figure 3B:
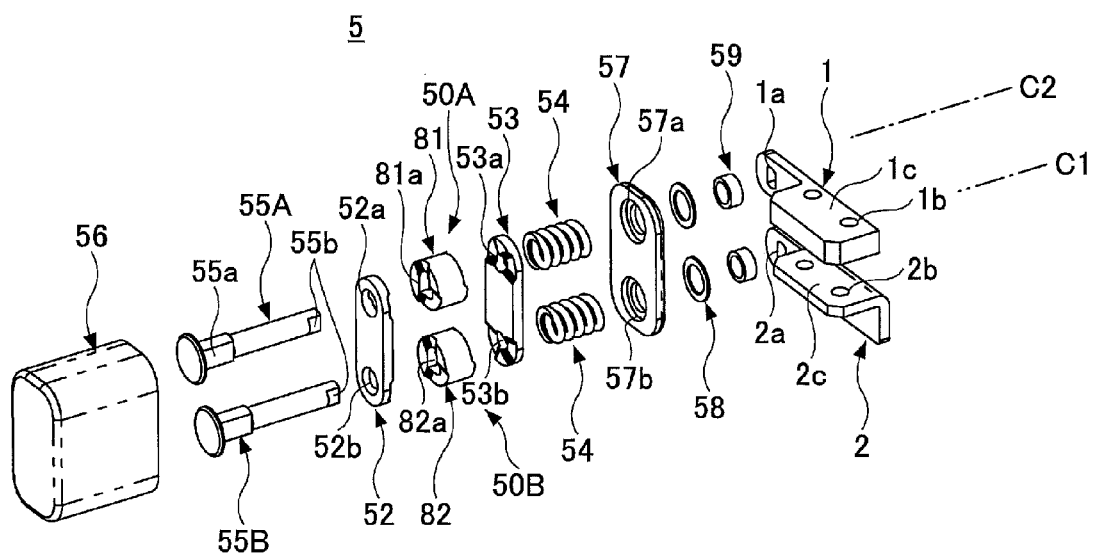
FIG. 3B is an exploded perspective view of a cam unit constituting a hinge apparatus for an electronic device according to the first embodiment of the present invention.

As illustrated in FIGS. 3A and 3B, the cam unit 5 has a first cam mechanism 50A and a second cam mechanism 50B arranged inside a hinge cover 56. The first cam part 50A includes, for example, a first cam portion (constituted by a spring 54, a first cam shaft 55A, and cam plates 52, 53) and a first cam 81. Further, the second cam part 50B includes, for example, a second cam portion (constituted by the spring 54, a first cam shaft 55B, and the cam plates 52, 53) and a second cam 82.

The first cam shaft 55A included in the first cam mechanism 50A is arranged in the hinge cover 56 to match the upper plate oscillation shaft line C2. By inserting the first cam shaft 55A through a bore part 52a of the cam plate 52, a bore part 53a of the cam plate 53, and a bore part 57a of a hinge cap 57 (which is to be a lid body of the hinge cover 56), the first cam shaft 55A is rotatably supported by the plates 52, 53, and the hinge cap 57.

The spring 54 is arranged between the cam plate 53 and the hinge cap 57. Further, the first cam 81 is arranged between the cam plate 52 and the cam plate 53.

The first cam shaft 55A includes a first intermediate key part 55a having an oval-shaped cross section. The first intermediate key part 55a is to engage an oval-shaped engagement bore 81a of the first cam 81a. In a mounted state, the first intermediate key part 55a engages the engagement bore 81a. Thereby, the first cam shaft 55A and the first cam 81 integrally rotate with each other.

The first cam shaft 55A includes a second intermediate key part 55b formed at its right end part in FIG. 3B. In a state where the cam unit 5 is assembled, the second intermediate key 55b is configured to project in a right direction of the hinge cap 57. The upper cam bracket 1 is mounted to the second intermediate key part 55b (projecting from the hinge cap 57) by way of a washer 58 and a sleeve 59.

An oval-shaped bore 1a is formed in an end part of the upper cam bracket 1. The second intermediate cam part 55b of the first cam shaft 55A is configured to engage the oval-shaped bore 1a of the upper cam bracket 1. Thus, the upper cam bracket 1 integrally rotates with the first cam shaft 55A by engaging the second intermediate key part 55b with the oval-shaped bore 1a. It is to be noted that a tip part of the second intermediate part 55b is fixed to the upper cam bracket 1 by caulking.

Figure 13:
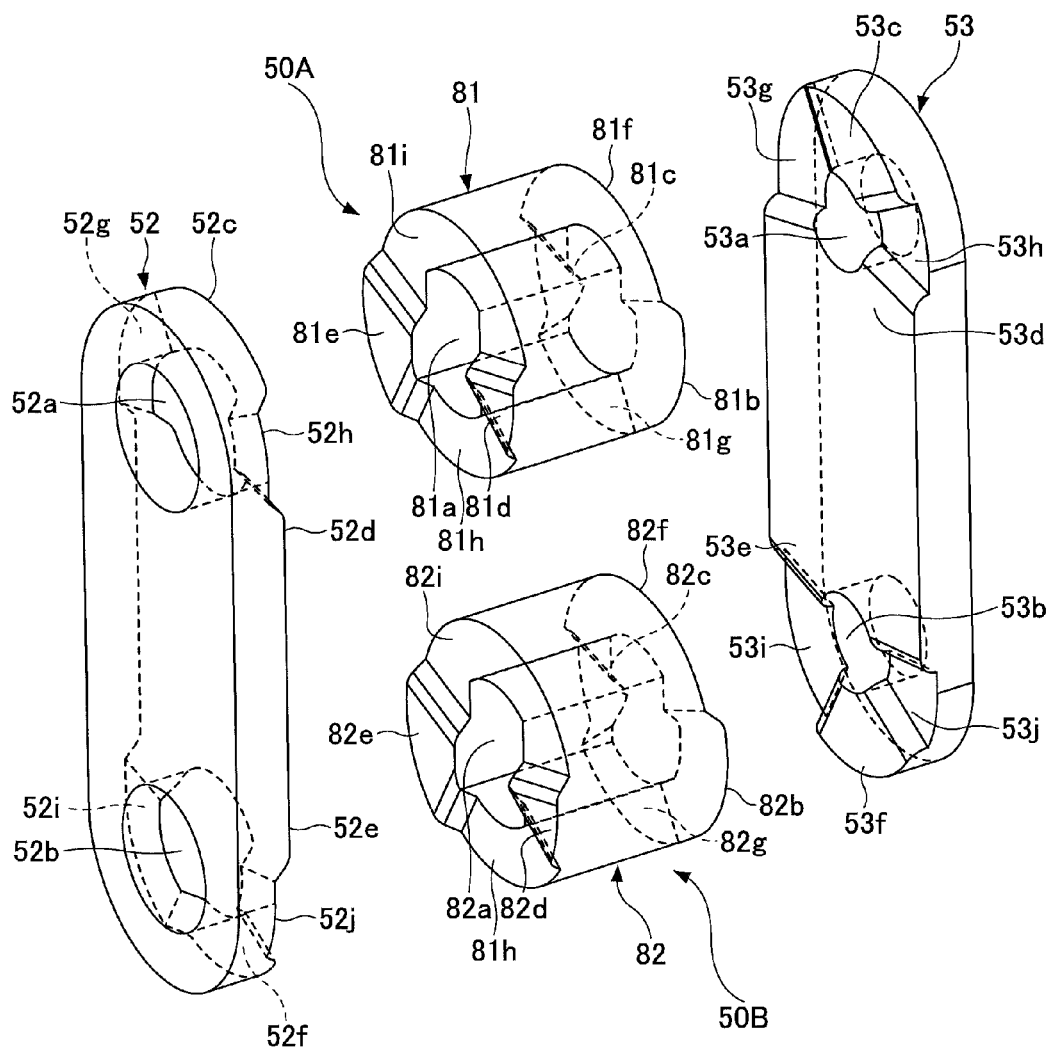
FIG. 13 is an exploded perspective view illustrating an enlarged cam mechanism of a hinge apparatus for an electronic device according to the first embodiment of the present invention.

As illustrated in an enlarged view of FIG. 13, the first cam portion is constituted by a peak part and a valley part formed in the cam plate 52, the cam plate 53, and the first cam 81, respectively. More specifically, the cam plate 52 includes a pair of peak parts 52c, 52d and a pair of valley parts 52g, 52h. Further, the cam plate 53 includes a pair of peak parts 53c, 53d and a pair of valley parts 53g, 53h.

Further, the first cam 81 has a pair of peak parts 81d, 81e and a pair of valley parts 81h, 81i formed on a surface facing the cam plate 52 and a pair of peak parts 81b, 81c and a pair of valley parts 81f, 81g formed on a surface facing the cam plate 53.

Each of the cam plate 52, the cam plate 53, and the first cam 81 has the pair of peak parts arranged at an interval of 180 degrees. Likewise, each of the cam plate 52, the cam plate 53, and the first cam 81 has the pair of valley parts arranged at an interval of 180 degrees. Further, adjacent peak parts and valley parts are arranged at an interval of 90 degrees.

Further, the peak parts 52c, 52d, and the valley parts 52g, 52h of the cam plate 52 and the peak parts 53c, 53d, the valley parts 53g, 53h of the cam plate 53 are arranged to have the same phase with each other. That is, the peak part 52c and the peak part 53c, the peak part 52d and the peak part 53d, the valley part 52g and the valley part 53g, and the valley part 52h and the valley part 53h are configured to face each other, respectively.

Next, the second cam mechanism 50B is described. The second cam mechanism 50B has substantially the same configuration as the configuration of the first cam mechanism 50A.

As illustrated in FIG. 3B, the second cam shaft 55A included in the second cam mechanism 50B is arranged in the hinge cover 56 to match the lower plate oscillation shaft line C1. By inserting the second cam shaft 55B through a bore part 52b of the cam plate 52, a bore part 53b of the cam plate 53, and a bore part 57b of the hinge cap 57 (which is to be a lid body of the hinge cover 56), the second cam shaft 55B is rotatably supported by the plates 52, 53, and the hinge cap 57.

The spring 54 is arranged between the cam plate 53 and the hinge cap 57. Further, the second cam 82 is arranged between the cam plate 52 and the cam plate 53.

Similar to the first cam shaft 55A, the second cam shaft 55B includes the first intermediate key part 55a having an oval-shaped cross section. The first intermediate key part 55a is to engage an oval-shaped engagement bore 82a of the second cam 82a. In a mounted state, the first intermediate key part 55a engages the engagement bore 82a. Thereby, the second cam shaft 55b and the second cam 82 integrally rotate with each other.

Further, the second cam shaft 55B includes the second intermediate key part 55b formed at its right end part in FIG.

3B. In a state where the cam unit 5 is assembled, the second intermediate key 55b is configured to project in a right direction of the hinge cap 57. The lower cam bracket 2 is mounted to the second intermediate key part 55b (projecting from the hinge cap 57) by way of the washer 58 and the sleeve 59.

An oval-shaped bore 1a is formed in an end part of the lower cam bracket 2. The second intermediate cam part 55b of the second cam shaft 55B is configured to engage the oval-shaped bore 1a of the lower cam bracket 2. Thus, the lower cam bracket 2 integrally rotates with the second cam shaft 55B by engaging the second intermediate key part 55b with the oval-shaped bore 2a. It is to be noted that a tip part of the second intermediate part 55b is fixed to the lower cam bracket 2 by caulking.

Similar to the first cam portion, the second cam portion is constituted by a peak part and a valley part formed in the cam plate 52, the cam plate 53, and the second cam 82, respectively. More specifically, as illustrated in the enlarged view of FIG. 13, the cam plate 52 includes a pair of peak parts 52e, 52f and a pair of valley parts 52i, 52j. Further, the cam plate 53 includes a pair of peak parts 53e, 53f and a pair of valley parts 53i, 53j.

Further, the second cam 82 has a pair of peak parts 82d, 82e and a pair of valley parts 82h, 82i formed on a surface facing the cam plate 52 and a pair of peak parts 82b, 82c and a pair of valley parts 82f, 82g formed on a surface facing the cam plate 53.

In the second cam portion, each of the cam plate 52, the cam plate 53, and the second cam 82 has the pair of peak parts arranged at an interval of 180 degrees. Likewise, each of the cam plate 52, the cam plate 53, and the second cam 82 has the pair of valley parts arranged at an interval of 180 degrees. Further, adjacent peak parts and valley parts are arranged at an interval of 90 degrees. Further, the peak part 52e and the peak part 53e, the peak part 52f and the peak part 53f, the valley part 52i and the valley part 53i, and the valley part 52j and the valley part 53j are configured to face each other, respectively.

In the cam unit 5 according to an embodiment of the present invention, the first cam portion constituting the first cam mechanism 50A is configured the same as the second cam portion constituting the second cam mechanism 50B. Further, the first cam 81 is configured the same as the second cam 82.

In the hinge apparatus D1 for an electronic device according to the first embodiment of the present invention, the upper plate 8 can be rotated 360 degrees relative to the lower plate 9 from the closed state illustrated in FIG. 1. However, among the pair of upper and lower cam mechanisms 50A, 50B of the cam unit 5, the cam mechanism 50A of the upper side is assigned with the rotation of 180 degrees whereas the cam mechanism of the lower side is assigned with the rotation of 180 degrees. In a state where the upper and lower plates 8, 9 are closed or in a state where the upper plate 8 is rotated 360 degrees and installed on a rear side of the lower plate 9 (rear installed state), the cam unit 5 retains the upper and lower plates 8, 9 in the aforementioned states by engaging the peak parts and the valley parts of the first and second cam portions and increasing the torque.

The cam unit 5 according to this embodiment of the present invention has two peak parts and valley parts arranged in portions of the first cam mechanism 50A where the cam plate 52, the cam plate 53, and the first cam 81 are formed, respectively. Likewise, the cam unit 5 according to this embodiment of the present invention has two peak parts and valley parts arranged in portions of the second cam mechanism 50B where the cam plate 52, the cam plate 53, and the first cam 81 are formed, respectively. However, the numbers of peak parts and valley parts to be formed in the first and the second cam mechanisms 50A, 50B is not limited to those described above, and may be arbitrarily changed according to, for example, the purpose of the hinge apparatus D1 for an electronic device.

Figure 4A:
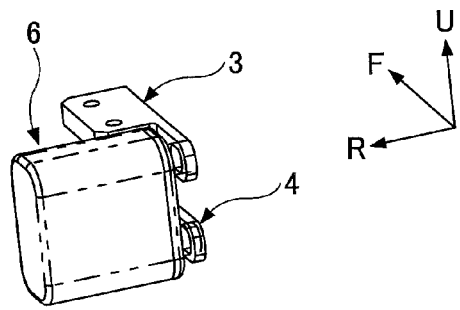
FIG. 4A is a perspective view of a gear unit constituting a hinge apparatus for an electronic device according to the first embodiment of the present invention.
Figure 4B:
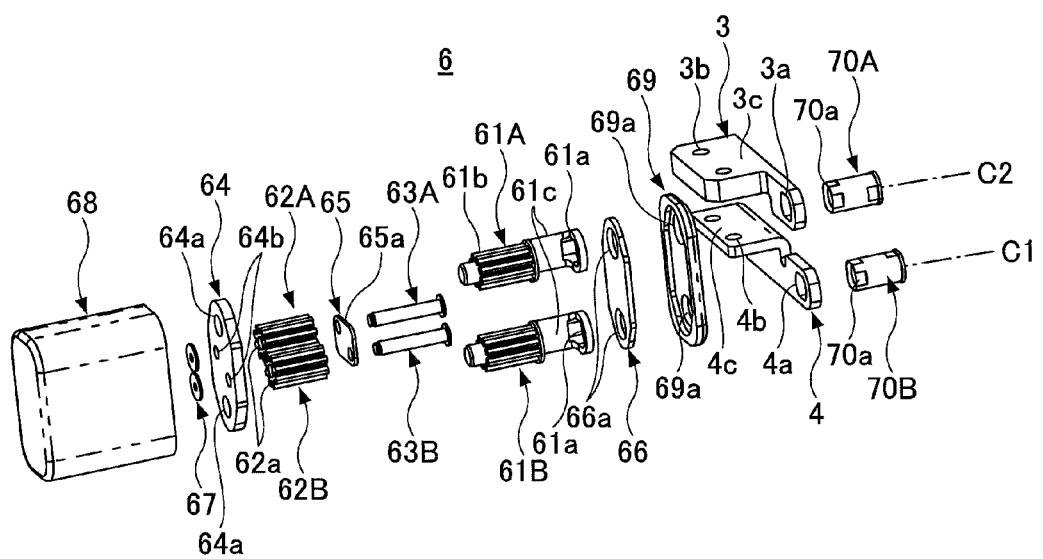
FIG. 4B is an exploded perspective view of a gear unit constituting a hinge apparatus for an electronic device according to the first embodiment of the present invention.

Next, the gear unit 6 is described with reference to FIGS. 4A and 4B.

The gear unit 6 has a configuration including, for example, a pair of first (upper) and second (lower) gear shafts 61A, 61B, a pair of gears 62A, 62B, a pair of gear shafts 63A, 63B, supporting plates 64, 66, a middle plate 65, a riveting plate 67, a gear cover 68, and a gear cap 69.

The first gear shaft 61A on the upper side is positioned on the upper plate oscillation shaft line C2, and the second gear shaft 61B on the lower side is positioned on the lower plate oscillation shaft line C1. The support plate 64 includes a pair of upper and lower engagement bores 64a to which the end parts of the first and second gear shafts 61A, 61B are rotatably engaged. Further, the support plate 64 includes bore parts 64b formed in an intermediate area (in the vertical direction) between the engagement bores 64a. Minor diameter parts formed on one end of the pair of gear shafts 63A, 63B are to be engaged to the bore parts 64b.

The middle plate 65 includes bore parts 65a to which the gear shafts 63A, 63B are inserted. The support plate 66 includes a pair of hole parts 66a to which end parts of the gear shaft 70A, 70B can be inserted. Further, the gear cap 69 includes a recess part (for installing the support plate 66) and a pair of hole parts 69a (to which end parts of the gear shafts 70A, 70B are inserted) formed on its end surface facing the gear cover 68.

After the tip parts of the gear shafts 63A, 63B are inserted in center bores 62a of the pair of upper and lower gears 62A, 62B and the bore parts 65a of the middle plate 65, the tip parts of the gear shafts 63A, 63B are further inserted to the bore parts 64b of the support plate 64. Then, the riveting plate 67 is fixed to the end parts of the gear shafts 63A, 63B projecting from the support plate 64 by caulking, to thereby constitute a sub-assembly (sub-ASSY).

Then, the sub-assembly is inserted to the gear cover 68; the plate 66 is contacted to the end parts of engagement bore parts of the first and second gear shafts 61A, 61B; and the gear cap 69 is engaged with an opening part of the gear cover 68.

After the pair of upper and lower gear shafts 70A, 70B are inserted to the holes 3a, 4a of the upper and lower gear brackets 3, 4, the hole parts 69a of the gear cap 69, and the hole parts 66a of the support plate 66, the upper and lower gear shafts 70A, 70B are engaged with the engagement bore parts 61a of the first and second gear shafts 61A, 61B.

Further, in the gear unit 6 according to this embodiment of the present invention, the gear shaft 70A is configured to match the upper plate oscillation shaft line C2, and the gear shaft 70B is configured to match the lower plate oscillation shaft line C1. Further, each of the gear shafts 70A, 70B includes an insertion hole 70a penetrating its center. The function of the insertion hole 70a is described below.

As described above, the gear unit 6 is formed by engaging the pair of gear shafts 70A, 70B with the first and second gear shafts 61A, 61B. The gear unit 6 integrally rotates the gear shaft 70A and the first gear shaft 61A and integrally rotates the gear shaft 70B and the first gear shaft 61B.

Further, the gear part 61b of the first gear shaft 61A meshes with the gear 62A, and the gear part 61b of the second gear shaft 61B meshes with the gear 62B. Further, the gear 62A meshes with the gear 62B. The gears 62A, 62B along with the gear parts 61b of the first and second gear shafts 61A, 61B constitute the gear mechanism taught in the claims.

Therefore, by rotating and urging the upper gear bracket 3 (joined to the gear shaft 70A) in one direction, the gear unit 6 rotates the lower cam bracket 2 (joined to the gear shaft 70B) in the other direction (direction opposite to the rotating direction of the upper gear bracket 3).

Further, the gear ratio between the gear parts 61b of the first and second gear shafts 61A, 61B of the gear unit 6 and the gears 62A, 62B is set, so that the rotation of the upper gear bracket 3 and the rotation of the lower gear bracket 4 are synchronized (so that rotation can be performed with the same angular velocity).

Further, the upper gear bracket 3 and the lower gear bracket 4 are restricted from uniquely rotating (oscillating) by being meshed and coupled to each of the gear parts 61b and the gears 62A, 62B. The upper gear bracket 3 is fixed to the upper plate 8. The lower gear bracket 4 is fixed to the lower plate 9. Thereby, the gear unit 6 rotates the lower and upper cam brackets 2, 4 in synchronization along with providing a function of a rotation prevention mechanism that prevents the lower and upper cam brackets 2, 4 from oscillating relative to each other.

Further, as described above, the upper plate 8 is fixed to the upper cam bracket 1 of the cam unit 5, and the lower plate 9 is fixed to the lower cam bracket 2 of the cam unit 5. Accordingly, when the cam unit 5 is rotated to a predetermined rotation angle for generating torque in a case where the upper plate 8 and the lower plate 9 are rotated in synchronization, the rotation of the upper plate 8 and the lower plate 9 is restricted by the increase of the torque.

Accordingly, with the hinge apparatus D1 for an electronic device according to the first embodiment of the present invention, the upper plate 8 and the lower plate 9 can be rotated in synchronization by the gear unit 6, and the rotation of the upper plate 8 and the lower plate 9 can be restricted to a desired rotation angle by the cam unit 5.

Figure 2:
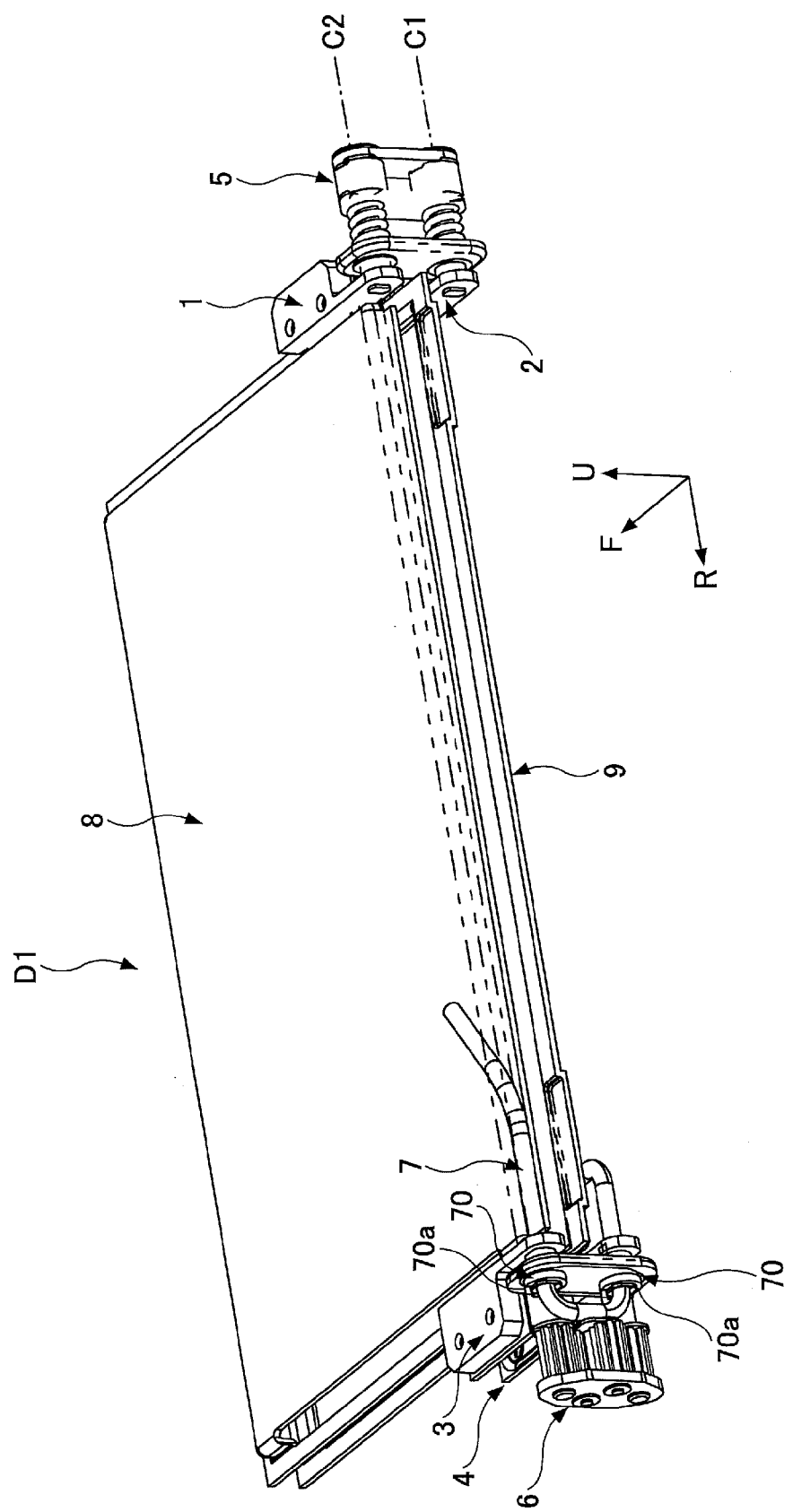
FIG. 2 is a rear perspective view of a hinge apparatus for an electronic device according to the first embodiment of the present invention.
Figure 8:
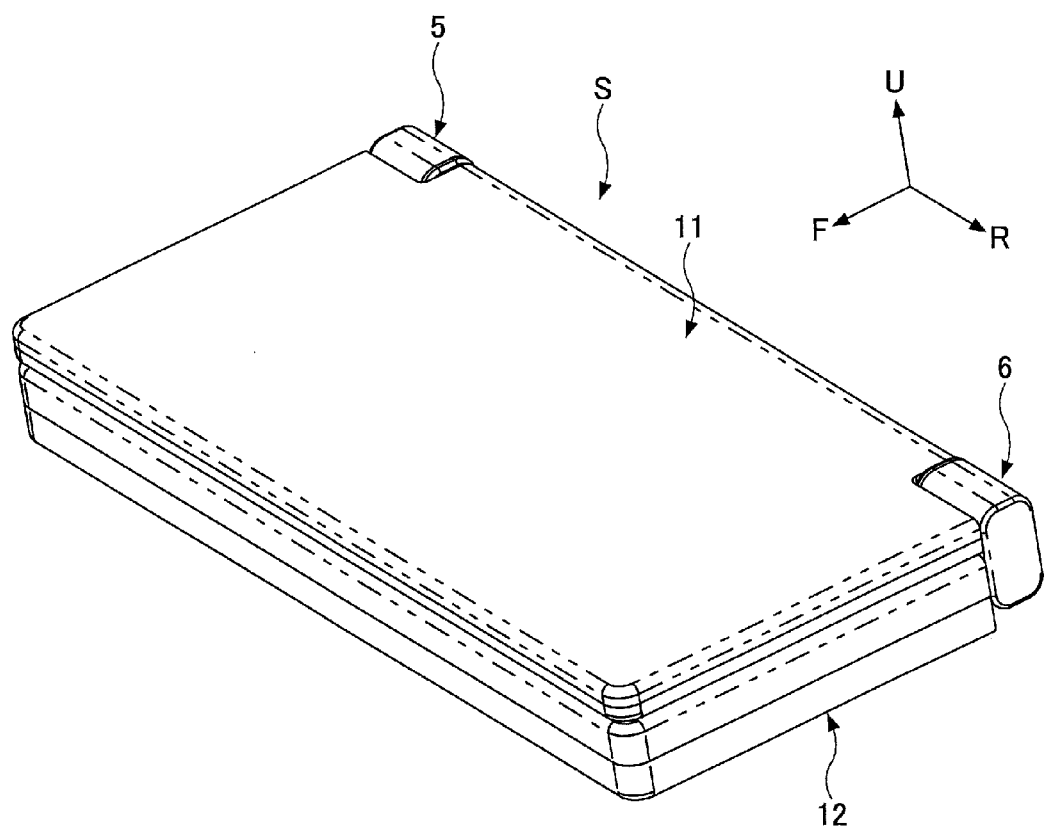
FIG. 8 is a perspective view illustrating an electronic apparatus using a hinge apparatus for an electronic device according to the first embodiment of the present invention.
Figure 9A:
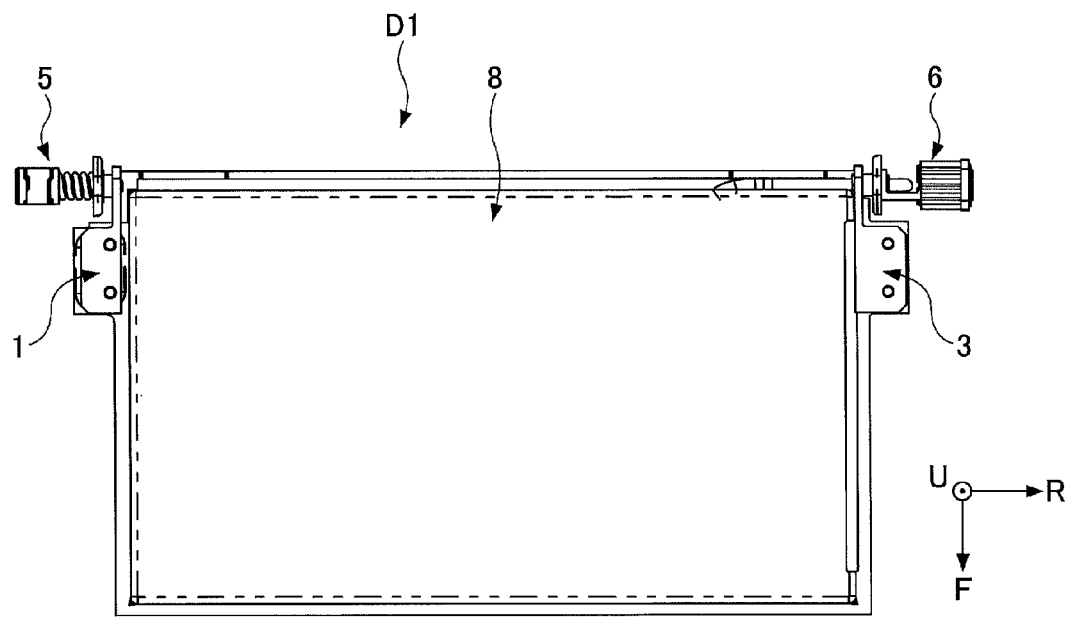
FIG. 9A is a plan view of a hinge apparatus for an electronic device according to the first embodiment of the present invention.
Figure 9B:
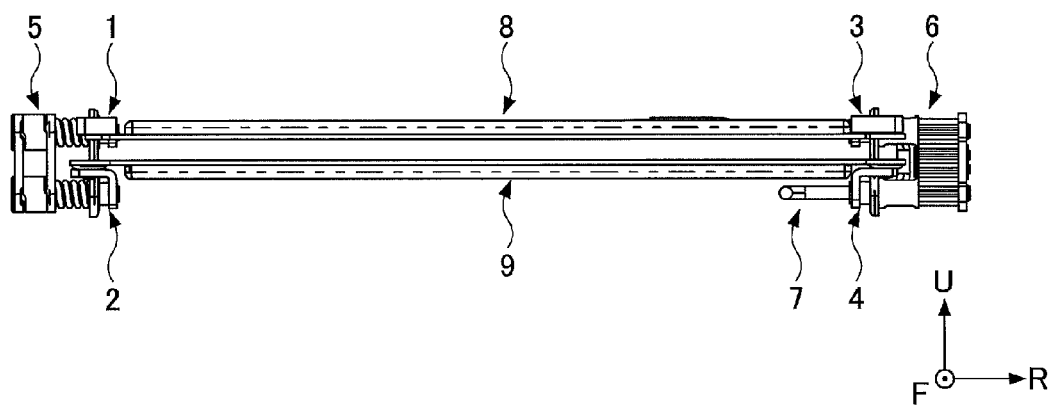
FIG. 9B is a front view of a hinge apparatus for an electronic device according to the first embodiment of the present invention.
Figure 9C:
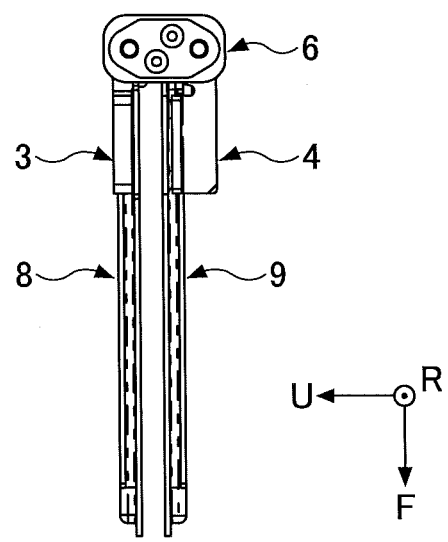
FIG. 9C is a right side view of a hinge apparatus for an electronic device according to the first embodiment of the present invention.
Figure 10C:
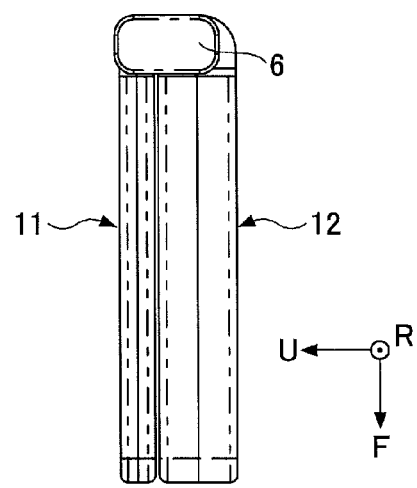
FIG. 10C is a right side view of an electronic apparatus using a hinge apparatus for an electronic device according to the first embodiment of the present invention.

Next, the insertion bores 70a that are formed in the gear shafts 70A, 70B are described. The insertion bore 70a functions as a wiring insertion bore to which a core (wiring) 7 is inserted as illustrated in FIGS. 1 and 2. As illustrated in FIG. 8, the hinge apparatus D1 constituted by the cam unit 5 and the gear unit 6 has the upper plate 8 fixed to an upper case of an electronic apparatus S which is to be the application target (see FIG. 6) and the lower plate 9 fixed to a lower case 12 of the electronic apparatus S. Electronic components are mounted to each of the upper and lower cases 11, 12. The cord 7 has a function of electrically connecting an electronic circuit mounted on the upper case 11 to an electronic circuit mounted on the lower case 12.

Thereby, although the cord 7 is to be arranged between the upper case 11 and the lower case 12, the cord 7 is preferred not to be exposed to the outside from an aspect of design and is liable of being pulled out in a case where, for example, external force is applied.

Figure 5B:
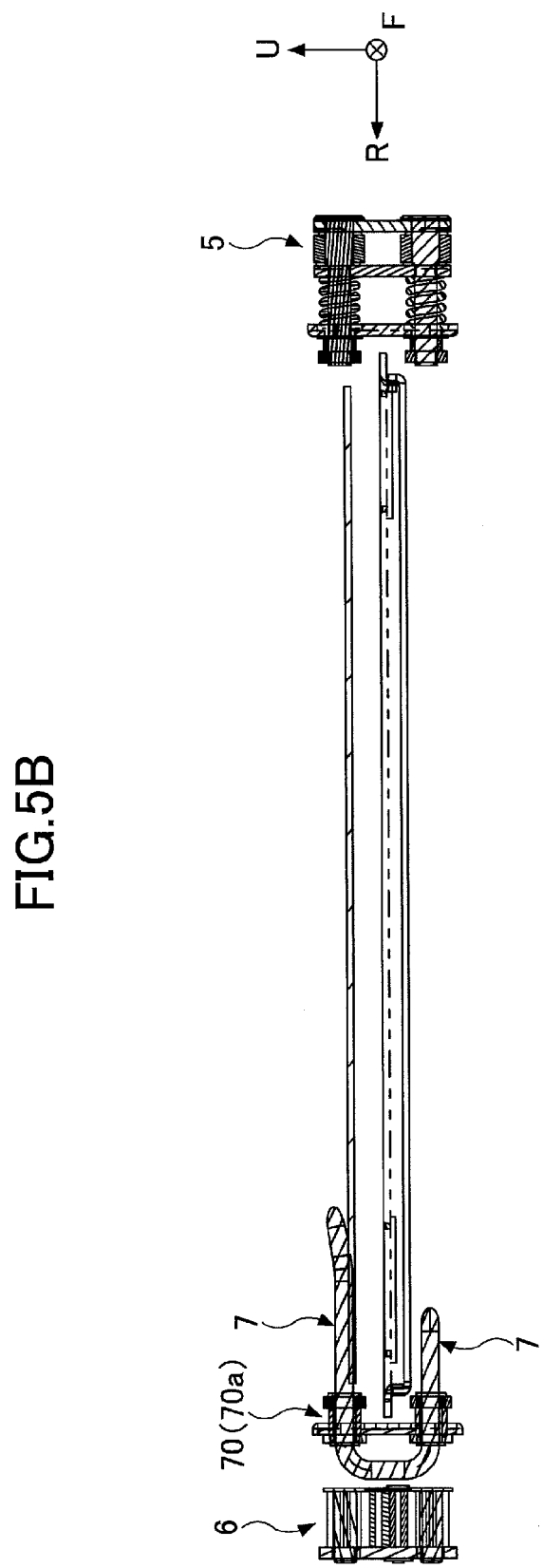
FIG. 5B is a front view illustrating a substantial part of a hinge apparatus for an electronic device according to the first embodiment of the present invention.
Figure 7:
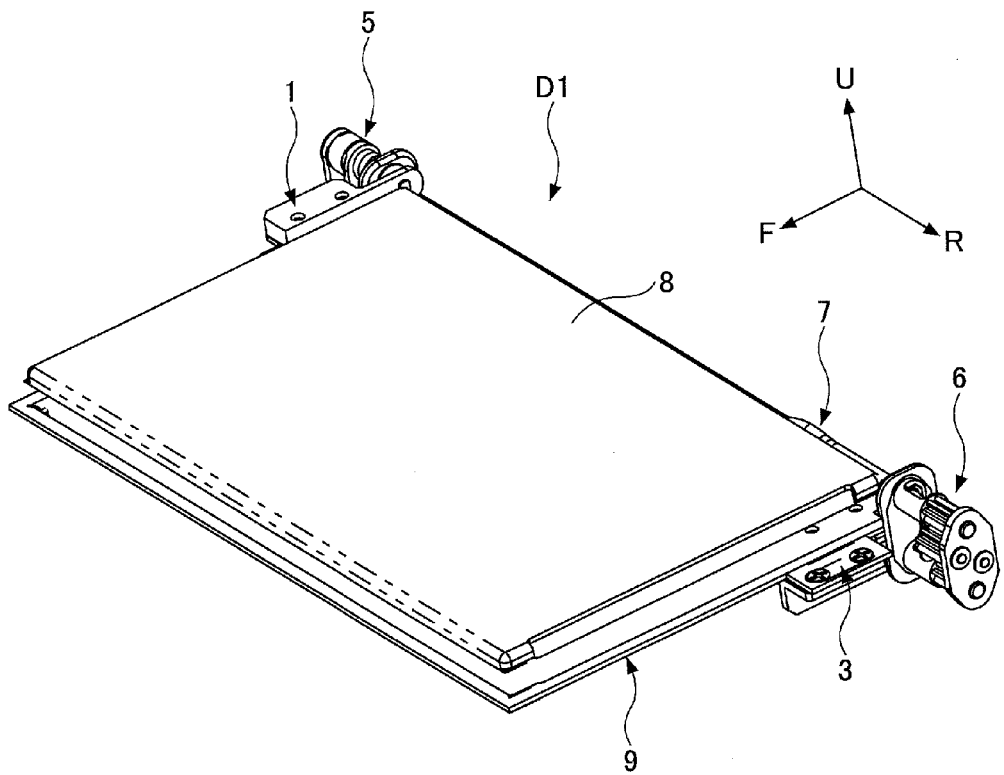
FIG. 7 is a front perspective view of a hinge apparatus for an electronic device according to the first embodiment of the present invention.

However, with the first embodiment of the present invention, the cord 7 can be connected between the upper case 11 and the lower case 12 inside the gear unit 6 (gear cover 68) by forming the insertion bores 70a in the gear shafts 70A, 70B and inserting the cord 7 to the insertion bores 70a as illustrated in FIGS. 5A and 5B. With this configuration, the appearance of the electronic apparatus S can be improved and it can be prevented from being pulled out.

Next, a hinge operation of the hinge apparatus D1 for an electronic device according to the first embodiment of the present invention is described.

In a case where the upper plate 8 is closed (closed state) relative to the lower plate 9 (as illustrated in FIGS. 7, 9A, 9B, and 9C), the upper case 11 of the electronic apparatus S is also closed (closed state) relative to the lower case 12 of the electronic apparatus S (as illustrated in FIGS. 8, 10A, 10B, 10C, 11A, and 14A).

Figure 14A:
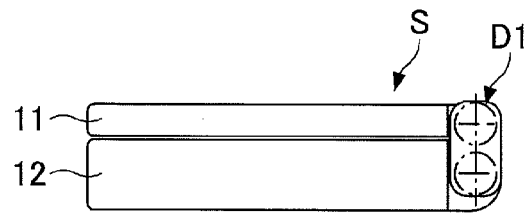
FIG. 14A is a side view of a closed state of an electronic apparatus using a hinge apparatus for an electronic device according to the first embodiment of the present invention.
Figure 14B:
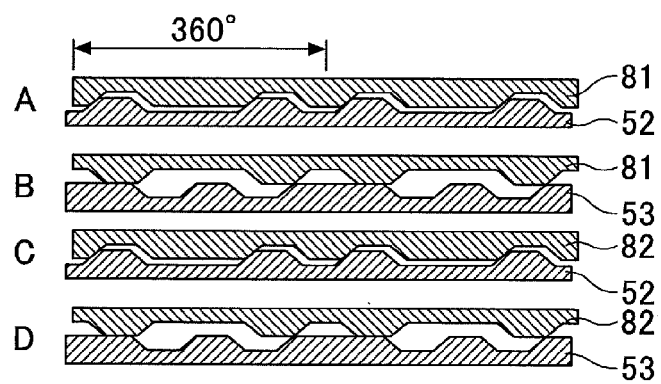
FIG. 14B is a developed view of cams of first and second cam portion in a closed state.

Further, in the peak parts and valley parts of the first and second cam portions included in the first and second cam mechanisms 50A, 50B, each of the peak parts and the valley parts of the first cam 81 and the cam plate 52 are engaged and the each of the peak parts and the valley parts of the second cam 82 and the cam plate 52 are engaged in this closed state as illustrated in FIG. 14B. Therefore, in the closed state, the hinge apparatus D1 for an electronic device is in a state where the torque is increased and where the rotation of the upper case 11 (upper plate 8) and the lower case 12 (lower plate 9) is restricted.

Figure 14C:
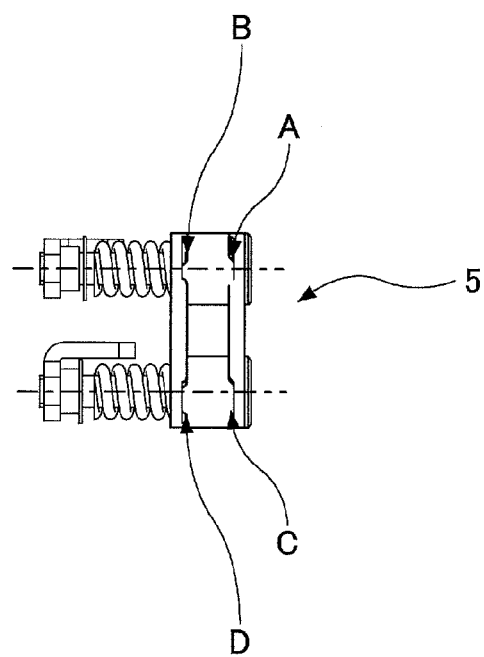
FIG. 14C is a rear view illustrating a closed state of a cam unit of the present invention.

It is to be noted that FIGS. 14B, 15B, 16B, and 17B are developed views of the cams of the first and second cam portions included in the first and second cam mechanisms 50A, 50B. Further, in FIG. 14C illustrating a rear surface of the cam unit 5, each of the cam parts indicated with letters A-D corresponds to letters A-D illustrated on the left side of the developed views of FIGS. 14B, 15B, 16B, and 17B.

In a case where the user opens the upper case 11 from the closed state by using a force greater than or equal to the above-described torque generated by the hinge apparatus D1, the upper case 11 begins a rotation (lid opening) movement relative to the lower case 12. In this case, the upper case 11 can be steadily opened relative to the lower case 12 because the rotation of the upper gear bracket 3 and the lower gear bracket 4 are synchronized by the function of the gear unit 6 included in the hinge apparatus D1 for an electronic device.

Figure 15A:
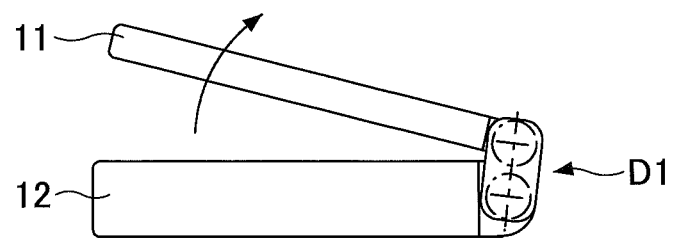
FIG. 15A is a side view illustrating a lid opening initiating state of an electronic apparatus using a hinge apparatus for an electronic device according to the first embodiment of the present invention.
Figure 15B:
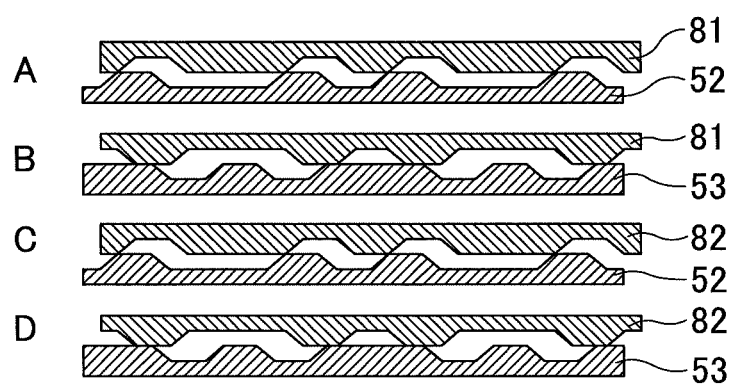
FIG. 15B is a developed view of cams of first and second cam parts in a lid opening initiating state.

Further, by rotating the upper case 11 (upper plate 8) relative to the lower case 12 (lower plate 9), the engagement of the peak parts and the valley parts between the first cam 81 and the cam plate 52 and the engagement of the peak parts and the valley parts between the second cam 82 and the cam plate 52 can be released as illustrated in FIG. 15B. Thereby, the engagement of all of the peak parts and valley parts of the first and second cam portions can be released. The rotation of the upper case 11 (upper plate 8) relative to the lower case 12 (lower plate 9) can be performed smoothly.

Figure 16A:
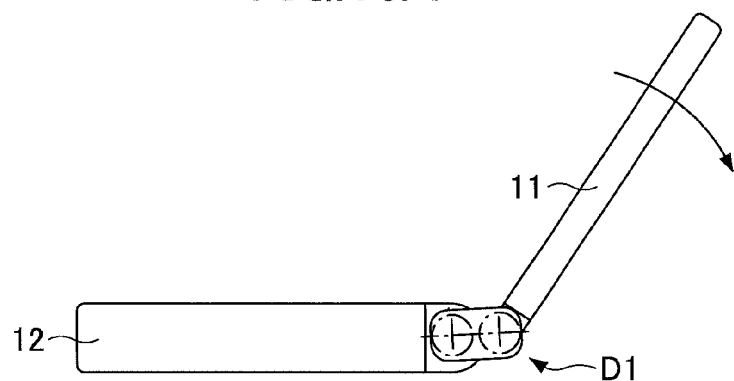
FIG. 16A is a side view illustrating a lid opening middle state of an electronic apparatus using a hinge apparatus for an electronic device according to the first embodiment of the present invention.
Figure 16B:
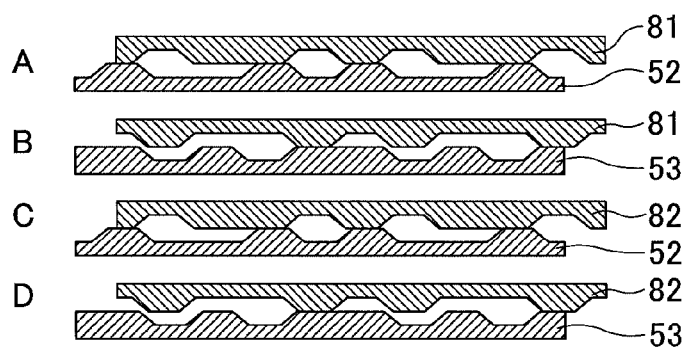
FIG. 16B is a developed view illustrating a lid opening middle state of cams of first and second cam parts.

FIGS. 16A, 16B illustrate a state where the upper case 11 (upper plate 8) is rotated 90 degrees or more relative to the lower case 12 (lower plate 9). In this state also, the engagement of all of the peak parts and valley parts of the first and second cam portions remains released.

Figure 11A:
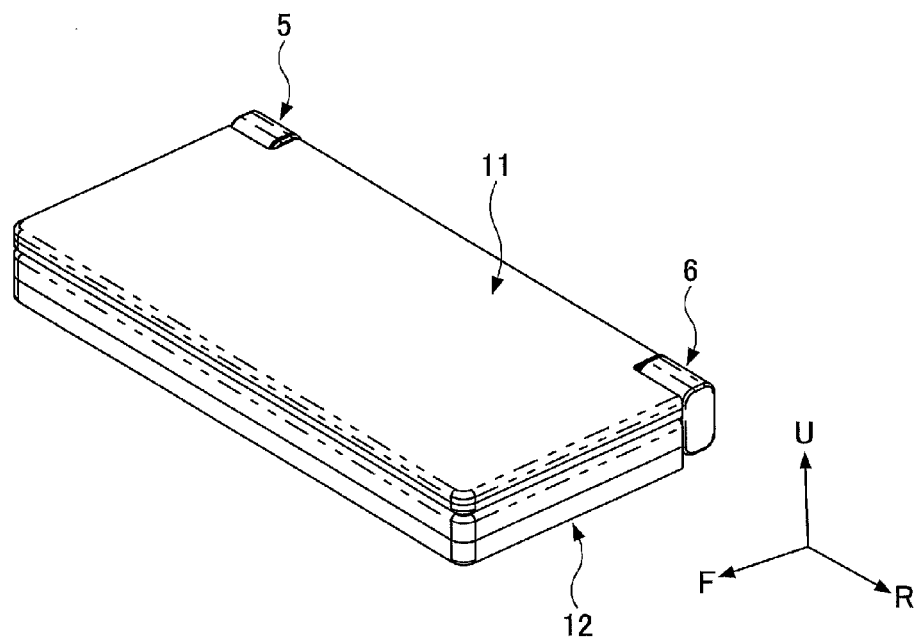
FIG. 11A is a perspective view illustrating a closed state of an electronic apparatus using a hinge apparatus for an electronic device according to the first embodiment of the present invention.
Figure 11B:
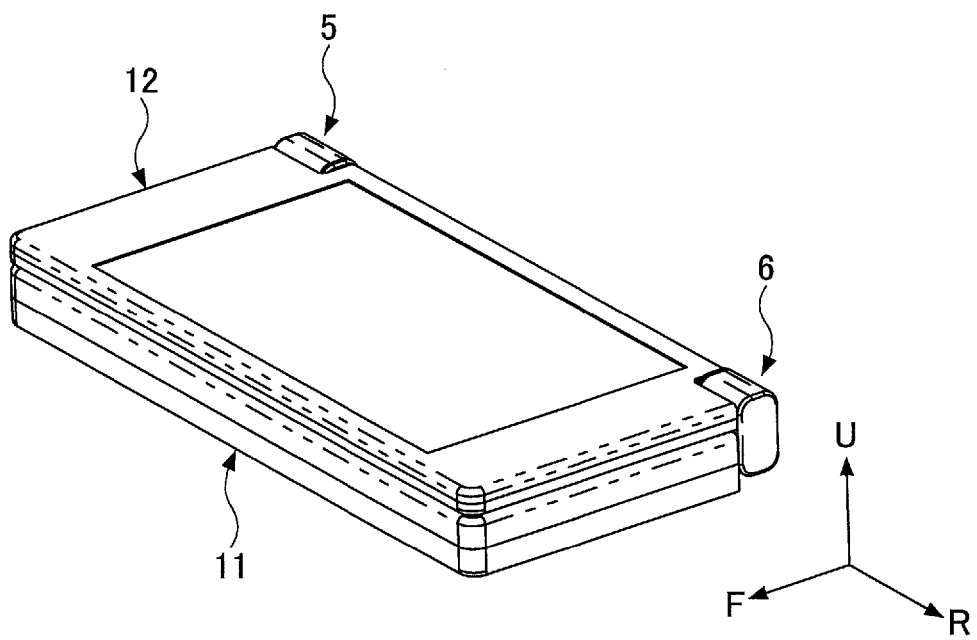
FIG. 11B is a perspective view illustrating a rear installed state of an electronic apparatus.
Figure 17A:
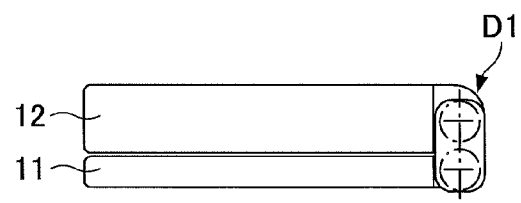
FIG. 17A is a side view illustrating a rear installed state of an electronic apparatus using a hinge apparatus for an electronic device according to the first embodiment of the present invention.

FIGS. 11B and 17A illustrate a state where the upper case 11 (upper plate 8) is rotated 360 degrees relative to the lower case 12 (lower plate 9). In this sate, the upper case 11 and the lower case 12 are superposed and vertically inverted relative to the closed state.

Further, in the peak parts and valley parts of the first and second cam portions included in the first and second cam mechanisms 50A, 50B, each of the peak parts and the valley parts of the first cam 81 and the cam plate 52 are engaged and the each of the peak parts and the valley parts of the second cam 82 and the cam plate 52 are engaged in the rear installed state as illustrated in FIG. 14B. Therefore, in the rear installed state also, the hinge apparatus D1 for an electronic device is in a state where the torque is increased and where the rotation of the upper case 11 (upper plate 8) and the lower case 12 (lower plate 9) is restricted.

Hence, with the above-described first embodiment of the hinge apparatus D1 for an electronic device and the electronic apparatus S including the hinge apparatus D1, the following effects can be attained.

By positioning the cam unit 5 on the left side of the upper plate 8 and positioning the cam unit 6 on the right side in FIG.

1, mechanisms need not be provided at a center area of the upper case 11 in the horizontal direction and at a center area of the lower case 12 in the horizontal direction. Accordingly, electronic components such as a display a touch panel can be arranged in those center areas. Thus, a large size display or a touch panel can be used for the electronic apparatus S.

Further, in a case of using only one of the upper case 11 and the lower case 12 where the upper case 11 has an oscillation angle of 360 degrees relative to the lower case 12, the upper case 11 can be chosen to be arranged in a rear installed position in which an outer surface of the upper case 11 is matched back to back with an outer surface of the lower case 12. After the rear installed position is chosen, the user may then choose to use either an inner surface of the upper case 11 or an inner surface of the lower case 12 by having the inner surface of the upper or lower case 11, 12 faced upward.

Further, in the cam unit 5 included in the hinge apparatus D1 for an electronic device, the cam 51 having a cylindrical shape is sandwiched between the cam plate 52 and the cam plate 53, and the outer peripheral surfaces of the cam plates 52, 53 having elliptical shapes are supported by an inner peripheral surface of the hinge cover 56. Thereby, the cam shafts 55A, 55B can be rotatably supported by the cam plates 52, 53. Thus, compared to supporting the cam shafts 55A, 55B with another configuration, the number of components can be reduced and size-reduction can be achieved.

Further, owing to the cord 7 being able to passed through the inside of the gear unit 6 by providing the insertion bores 70a in the gear shafts 70A, 70B of the gear unit 6 according to the first embodiment of the present invention, the cord 7 can be prevented from being exposed to the outside. Thus, the cord 7 can electrically connect the upper and lower plates 8, 9 while being appropriately protected.

Further, because the first and second gear shafts 61A, 61B include communicating parts 61c provided at the outer sides in the radial directions of the upper and lower plate oscillation shaft lines C1, C2 (provided in the extending direction of the cord 7). Therefore, even in a case where the upper plate 8 is oscillated relative to the lower plate 9, each of the gear shafts 61, 61B can be prevented from interfering the cord 7.

In the above-described first embodiment, the upper plate 8 and the lower plate 9 provide the function of a rotation prevention unit. In an alternative embodiment, a synchro-bar may be provided separately from the upper plate 8 for providing the function of the rotation prevention unit. Next, the alternative embodiment (second embodiment) is described.

FIG. 12 illustrates the second embodiment of the present invention. It is to be noted that, in FIG. 12, like components are denoted by like reference numeral as those of the first embodiment (described with FIGS. 1-11) and are not further explained.

As illustrated in FIG. 12, in a hinge apparatus D2 for an electronic device according to the second embodiment of the present invention, the upper cam bracket 1 and the upper gear bracket 3 are fixed to the upper case 11 made of resin, and the lower cam bracket 2 and the lower gear bracket 4 are fixed to the lower case 12 made of resin (not illustrated).

In the second embodiment of the present invention, instead of using the upper plate 8 and the lower plate 9, a synchro-bar 13 is used for coupling the upper cam bracket 1 and the upper gear bracket 3, and a synchro-bar 14 is used for coupling the lower cam bracket 2 and the lower gear bracket 4.

The synchro-bars 13, 14 are both formed of a plate-like member. In order to increase rigidity and facilitate attachment, both end parts of the synchro-bars 13, 14 are bent and have a C-shaped cross section. The synchro-bars 13, 14 are vertically arranged relative to the upper case 11.

With the hinge apparatus D2 for an electronic device according to the second embodiment of the present invention, a space can be formed at a center area between the cam unit 5 and the gear unit 6 because both the synchro-bars 13, 14 are formed of a plate-like member. Accordingly, a large space for arranging liquid crystal displays or the like can be obtained.

In the second embodiment of the present invention, the synchro-bars 13, 14 function as the rotation prevention unit. However, similar to the first embodiment, the upper plate 8 and the lower plate 9 may also be used to function as the rotation prevention unit by fixing the upper cam bracket 1 and the upper gear bracket 3 to the upper plate 8 and fixing the lower cam bracket 2 and the lower gear bracket 4 to the lower plate 9.

Further, the present invention is not limited to these embodiments, but various variations and modifications may be made without departing from the scope of the present invention.

For example, although the cam unit 5 is arranged on the left side whereas the gear unit 6 is arranged on the right side in the above-described embodiments, the cam unit 5 may be arranged on the right side whereas the gear unit 6 is arranged on the left side.

Although the term "left/right direction (horizontal direction)" is used for clarifying the positional relationship of the cam unit 5 and the gear unit 6, the term "left/right direction (horizontal direction)" indicates the width direction of the above described electronic apparatus S or the hinge apparatuses D1, D2. Thus, "left side" indicates "left direction" and "right side" indicates "right direction" where the benchmark is the center of the electronic apparatus S and the hinge apparatus D1, D2 in the width direction. Thus, positions can be defined even where the front/back direction does not match the vertical direction or where the front/rear direction does not match the horizontal direction.

The present international application is based on Japanese Patent Application Nos. 2010-157781 and 2011-148699 filed on Jul. 12, 2010 and Jul. 4, 2011, respectively, the entire contents of which are incorporated herein by reference.

The invention claimed is:

1. A hinge apparatus for an electronic device comprising:
a first plate;
a second plate;
a cam unit; and
a gear unit;
wherein the cam unit includes
    a first cam shaft configured to rotate with and be connected to a first cam bracket fixed to the first plate,
    a first cam mechanism, including a first spring, that causes the first cam shaft to generate a first torque upon rotation of said first cam shaft,
    a second cam shaft configured to be independently rotatable relative to the first cam shaft and connected to a second cam bracket fixed to the second plate,
    a second cam mechanism, including a second spring, that causes the second cam shaft to generate a second torque upon rotation of said second cam shaft, and
    a cam cover configured to contain an arrangement of the first cam shaft, the second cam shaft, the first cam mechanism and the second cam mechanism,
wherein the gear unit includes
    a first gear shaft configured to rotate with and be connected to a first gear bracket fixed to the first plate,
    a first gear part arranged on the first gear shaft,
    a second gear shaft configured to rotate with and be connected to a second gear bracket fixed to the second plate, a second gear part arranged on the second gear shaft,
the first gear part, the second gear part and a pair of gears meshed with the first and second gear parts, are configured to synchronize and rotate the first gear shaft and the second gear shaft via the pair of gears, and
a gear cover configured to contain an arrangement of the first gear shaft, the second gear shaft, the first gear part, the second gear part and the pair of gears,
wherein the cam unit is positioned adjacent to one edge of the first and second plate and the gear unit is positioned adjacent to an opposite edge of the first and second plate, the first and second plates being rotatable relative to each other,
wherein the cam unit and the gear unit are independent units that are independently connected to the first and second plates.

2. The hinge apparatus as claimed in claim 1, wherein the first gear shaft and the second gear shaft are configured to rotate in different directions relative to each other.

3. The hinge apparatus as claimed in claim 1, wherein the first and second cam mechanisms are configured to generate the first torque and second torque one time when the second plate is rotated 360 degrees relative to the first plate.

\* \* \* \* \*